United States Patent [19]

Whittington

[11] Patent Number: 5,040,687
[45] Date of Patent: Aug. 20, 1991

[54] WALL-MOUNTED COMPACT DISC DISPLAY

[76] Inventor: Jeffrey L. Whittington, 3538 Cooper Blvd., Springfield, Mo. 65802

[21] Appl. No.: 543,455

[22] Filed: Jun. 26, 1990

[51] Int. Cl.$^5$ .............................................. A47F 5/08
[52] U.S. Cl. ..................................... 211/40; 211/41; 211/71; 211/88; 248/205.2; 312/10
[58] Field of Search ....................... 211/40, 41, 71, 87, 211/88; 248/205.2; 312/10; 206/387

[56] References Cited

U.S. PATENT DOCUMENTS

| | | | |
|---|---|---|---|
| 4,290,530 | 9/1981 | Wooster | 211/40 |
| 4,684,030 | 8/1987 | Gurzynski | 211/88 |
| 4,770,292 | 9/1988 | Handler | 220/23.4 |
| 4,780,349 | 10/1988 | Gieske et al. | 428/100 |
| 4,781,292 | 11/1988 | Sacherman | 206/309 |
| 4,867,306 | 9/1989 | Factor | 211/40 |
| 4,940,147 | 7/1990 | Hunt | 211/40 |
| 4,951,826 | 8/1990 | Tompkins | 312/10 |

Primary Examiner—Carl D. Friedman
Assistant Examiner—Derek J. Berger
Attorney, Agent, or Firm—Litman, McMahon & Brown

[57] ABSTRACT

A wall-mounted apparatus for storage and display of containers for stored media, particularly for storage of compact discs and display of artwork and information regarding each of the compact discs that is located directly behind a container's front cover. The apparatus includes a generally flat rectangular support panel for mounting onto a wall and a plurality of frame members fixedly attached to the support panel and projecting forwardly thereupon so as to form a grid having a plurality of rectangular sections. Hook-and-loop fasteners are adhered to each of the rectangular sections and to a back surface of each compact disc container allowing for mounting of compact disc containers on the support panel and within each of the rectangular sections. The horizontal raised strips of each rectangular section have first and second grooves, to provide space for a compact disc user's fingers to facilitate the opening of the front cover of the compact disc and the removal of the containers from the panel.

4 Claims, 2 Drawing Sheets

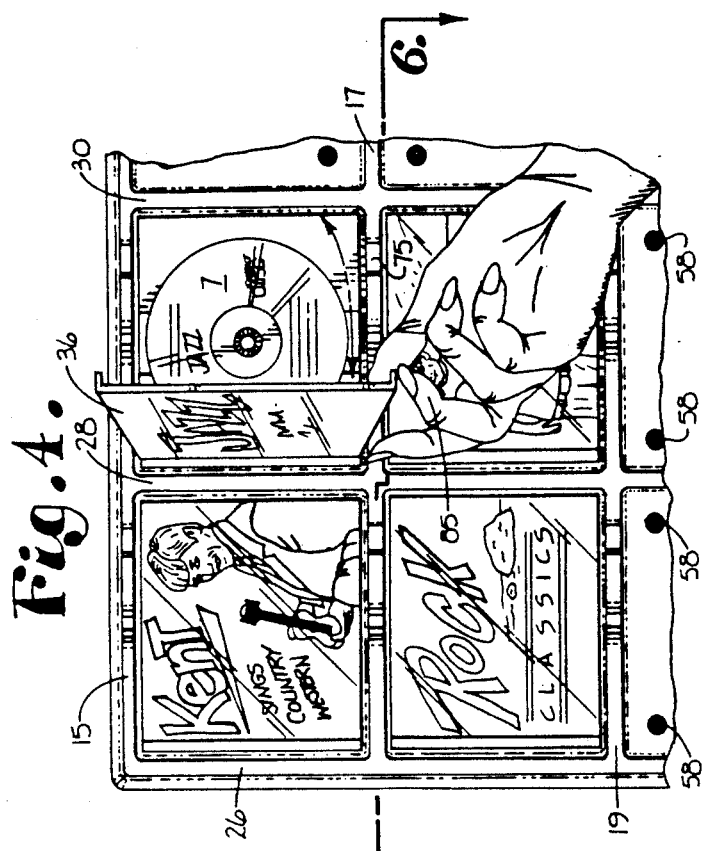
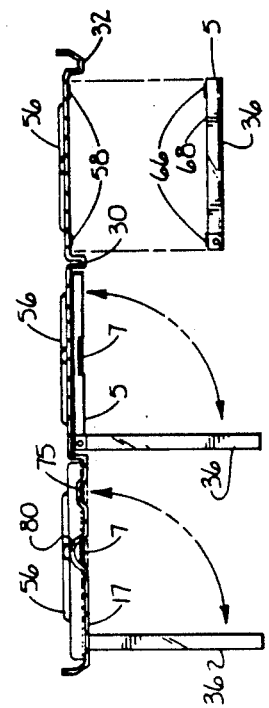
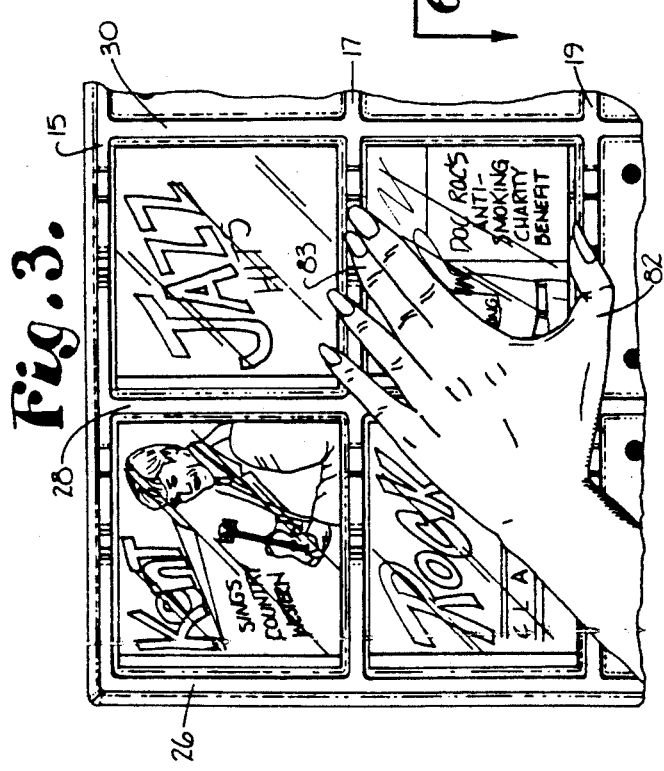
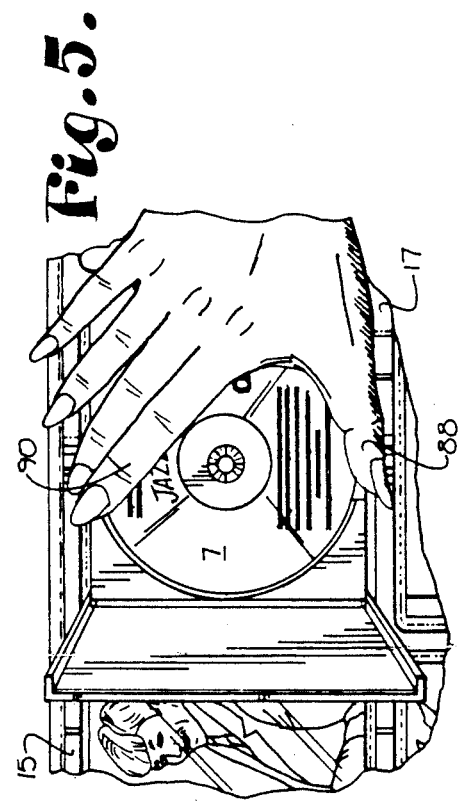

WALL-MOUNTED COMPACT DISC DISPLAY

BACKGROUND OF THE INVENTION

The present invention relates to an apparatus for storing and displaying stored media and, particularly, to a wall-mounted compact disc display apparatus for storing compact discs located within compact disc containers and for displaying artwork and other information regarding a compact disc located behind a hinged front cover of the compact disc container. The apparatus utilizes hook-and-loop fastening means to selectively and arrangeably mount compact disc containers thereon and includes frame members adapted to surround each compact disc container and having grooves to provide space for a compact disc user's fingers when opening the front cover of a compact disc container, removing a compact disc and removing a compact disc container from the apparatus.

Compact discs have replaced phonograph records as the preferred medium for audio recording. Therefore, the number of users of compact discs has continued to increase, resulting in a need for devices to conveniently store compact discs, to make the discs readily accessible and to display cover information and artwork.

Storage and display devices and techniques utilized for phonograph records are not readily suitable for compact discs or other types of media stored in relatively small, rectangular plastic containers, such as audio and video cassettes, primarily because such compact discs and similar media are stored within plastic containers rather than larger, thin, cardboard record sleeves. A compact disc container is usually made from clear plastic and has a hinged front cover. The inner portion of the front cover typically includes a slot at the top and bottom edges thereof adapted to hold a folded or unfolded slip or sheet of paper against the cover's inner surface. Artwork, title, artist and other identifying information of the compact disc are usually printed on a front side of such a slip of paper, allowing a user to view the artwork and identify the compact disc through the clear plastic container cover and requiring a user to slide the slip of paper from behind the cover, remove the paper from the container and possibly unfold the paper to read detailed information regarding the disc's contents.

Because compact discs and cover information sheets must be removed from the front of the compact disc container and cannot be slidingly removed from the side of the cover like a record phonograph, stacking of compact disc containers is not as advantageous as stacking cardboard album covers. Furthermore, unlike a traditional cardboard album cover, identification of the compact disc is not always placed on the side of the container. Therefore, if compact discs are stored vertically and stacked adjacent to each other, a user may not be able to readily identify even basic information regarding the discs.

A compact disc is substantially smaller than an album and is housed in a container that is smaller in length and height but slightly greater in width than an album cover. Because of the smaller size and greater durability of compact discs, portable and vehicle-installed compact disc players are popular. Therefore, a compact disc storage apparatus that allows for either quick removal and replacement of the compact disc alone, when a compact disc player is nearby, or the like quick removal and replacement of container and disc together for transport, is preferable.

Prior art compact disc storage apparatus have included devices for stacking compact disc containers adjacent to each other similar to cardboard album covers, but placing each container in a separate pivotable member, permitting each disc container to be pivoted forward, bringing each successive front cover into view. Although such a device allows for generally compact storage of the discs, the artwork under each disc container cover is not always in view and the container must be completely removed from the device to remove either the compact disc or the information located behind the front cover.

Compact disc container features, such as the smaller size of the container and plastic construction providing greater stability and hinged front cover, create options for storage and display not possible with cardboard album covers. The apparatus of the present invention takes advantage of such features.

SUMMARY OF THE INVENTION

A media storage and display apparatus of the invention disclosed in this application includes a generally flat, rectangular support panel adapted for mounting onto a wall and having a plurality of frame members fixedly attached thereto and projecting forwardly therefrom. The frame members include a plurality of parallel, horizontal raised strips and a plurality of parallel, vertical raised strips dividing the support panel into smaller, generally equally-shaped, rectangular sections and defining a raised grid or matrix above the support panel.

Hook-and-loop fastening material is adhered by gluing or otherwise fixedly attached to each of the rectangular support panel sections and is removably secured to a back side of each compact disc or other media storage container to be mounted on the apparatus. The hook-and-loop fastening material on the container is located or aligned so as to mate with the hook-and-loop fastening material on the support panel when each container is received within a selected section encompassed by portions of the strips forming the grids thereby, allowing for the selective mounting of a respective compact disc container on each rectangular section between the horizontal and vertical strips.

The horizontal strips of each rectangular section have first and second grooves. The first groove is located near a vertical strip and positioned to the left thereof when a user is facing the front of the apparatus. The first groove is adapted to provide space for a compact disc user's fingers to grasp and open the hinged front cover of a compact disc container at either the top or the bottom of the front cover. The second groove is located at a point midway between the vertical strips and is adapted to provide space for a compact disc user's fingers to grasp opposite edges of a compact disc and remove the disc from the compact disc container or to grasp the compact disc container and remove both the compact disc and container from the hook-and-loop fastening material on the support panel. The hook-and-loop fastening material on each container can be readily removed and placed on another container, such that a user can easily and frequently change the selection of discs stored on the apparatus.

OBJECTS OF THE INVENTION

Therefore, the objects of the present invention are: to provide an improved media storage and display apparatus and particularly an improved compact disc storage and display apparatus; to provide such an apparatus that is wall-mounted; to further provide such an apparatus that provides easy removal of either the compact disc alone, the printed information regarding the disc alone, or the compact disc and compact disc storage container as a unit from the apparatus; to provide such an apparatus that allows for total display of artwork and other information on or under a front cover of each storage container mounted on the apparatus; to provide such an apparatus that utilizes fastening means that may be easily and removeably adhered to a back surface of a storage container and a front surface of the apparatus; to further provide such an apparatus wherein the fastening means are hook-and-loop fasteners; to provide such an apparatus that includes dividing means between each storage container for easy organization, attractive, orderly display and forms a frame around the artwork associated with each container; to further provide such a dividing means that includes grooves adapted to accomodate a user's fingers when opening a front cover of each storage container mounted on the apparatus, removing each compact disc or other media from an open storage container or removing each storage container from the apparatus; to provide such an apparatus that is relatively easy to use, inexpensive to construct and particularly well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is an enlarged, fragmentary, front elevational view of the apparatus shown with compact disc containers mounted thereon and a hand positioned to remove a container therefrom.

FIG. 4 is an enlarged, fragmentary, front elevational view of the apparatus shown with compact disc containers mounted thereon and showing a hand opening a compact disc container cover.

FIG. 5 is an enlarged, fragmentary, front elevational view of the apparatus shown with an open compact disc container and a hand positioned to remove a compact disc from the container.

FIG. 6 is an enlarged, fragmentary, cross-sectional view taken along line 6—6 of FIG. 4 shown with two compact disc containers in an open position and a closed compact disc container shown removed from the apparatus.

DETAILED DESCRIPTION OF THE INVENTION

Figure 2:
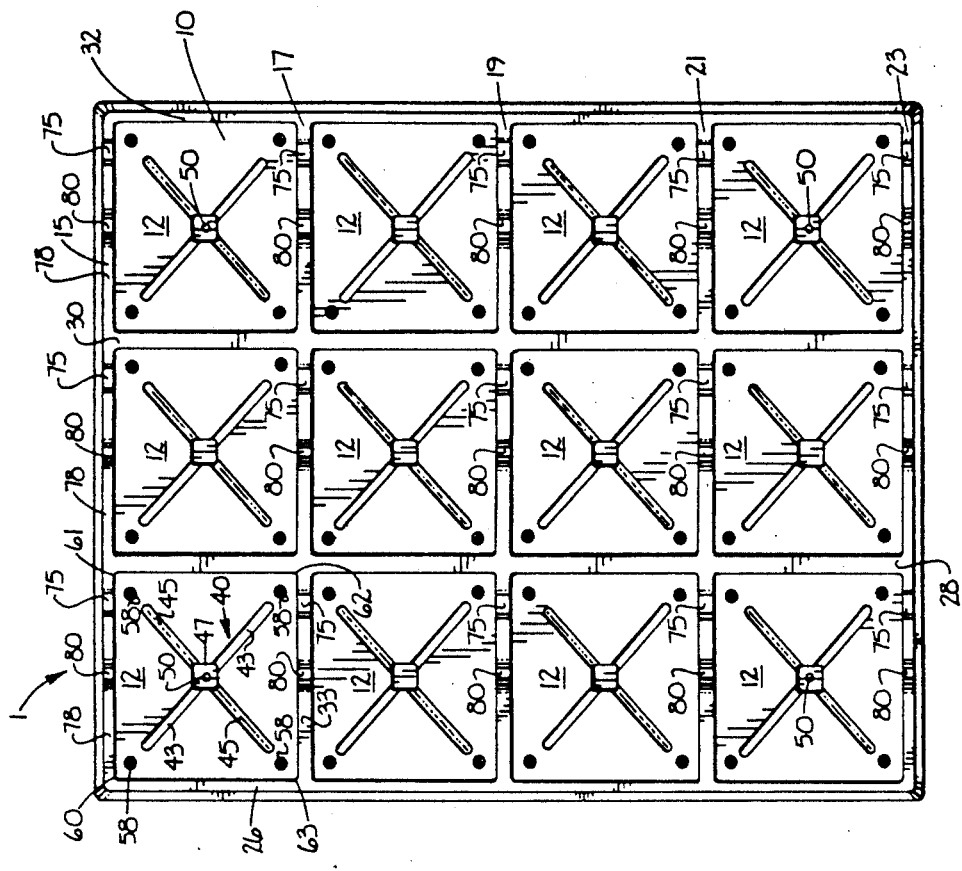
FIG. 2 is an enlarged, front elevational view of the apparatus.
Figure 1:
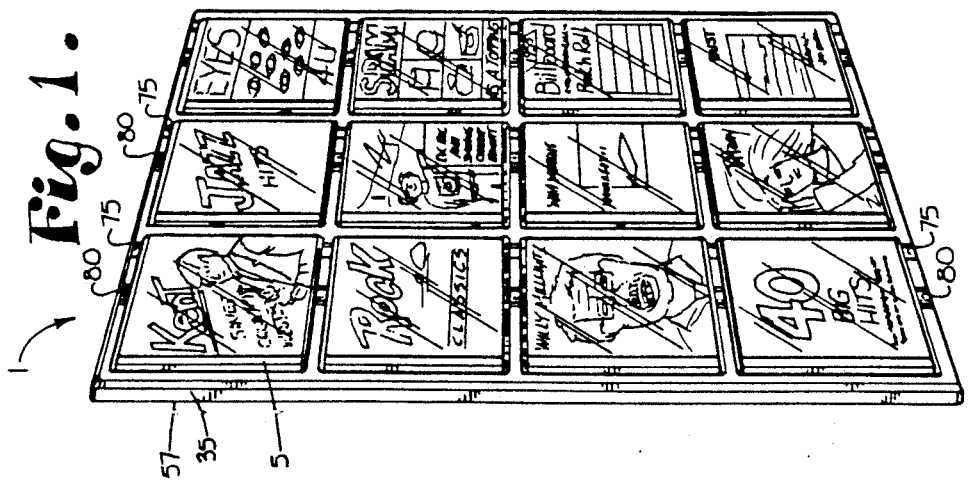
FIG. 1 is a perspective view of an embodiment of the wall-mounted compact disc display apparatus in accordance with the present invention shown with compact disc containers mounted thereon.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in detail, a wall-mounted apparatus of the present invention is generally designated by the reference numeral 1 and is for storage and display of containers for stored media such as compact disc containers 5 housing compact discs 7. The apparatus 1 includes a generally flat, rectangular support panel 10 divided into a plurality of rectangular sections or portions of equal area (twelve in the illustrated embodiment, generally designated by the reference numeral 12) by raised frame means such as the illustrated parallel elongate frame members or strips 15, 17, 19, 21 and 23 intersecting with and perpendicular to parallel elongate frame members or strips 26, 28, 30 and 32.

Frame members 15, 17, 19, 21 and 23 and frame members 26, 28, 30 and 32 are fixedly attached to or integral with support panel 10 and are raised or otherwise project forwardly from support panel 10 to form an ornamental and encompassing grid 33 when the panel 10 is in a vertical position a distance slightly less than the thickness or width 34 of a closed compact disc container 5. The ends of frame members 15 and 23 connect with and are perpendicular to the ends of frame members 26 and 32 to form an outer rectangular frame 35.

The support panel 10 and each of the frame members 15, 17, 19, 21, 23, 26, 28, 30 and 32 are preferably constructed as an integral unit of molded plastic material. It is foreseen that the apparatus of the present invention may alternatively be made from a variety of other rigid materials, such as wood, metal or the like. It is also foreseen that the apparatus of the present invention may be made smaller or larger and have either more or fewer than twelve of the rectangular sections 12, as is illustrated. Each rectangular section 12 is slightly larger than the surface area of a front cover 36 of a compact disc container 5. It is foreseen that the apparatus 1 may be modified for use with audio, video tape, or other media storage containers by forming rectangular sections 12 having an area slightly larger than the surface area of a front cover of such containers.

The back of each of the rectangular sections 12 of the support panel 10 includes a recessed portion 40 having first and second diagonal segments 43 and 45 and a rectangular segment 47 generally located at the intersection of segments 43 and 45. An aperture 50 is centrally located on the rectangular segment 47 of each of the sections 12 located at corners of the apparatus 1 for mounting the apparatus 1 on a wall (not shown) by placing a bolt or other type of fastener (not shown) therethrough and into the wall.

When the apparatus 1 is mounted on a wall, the heads of the fittings used for mounting are positioned within the rectangular segment 47 of the recessed portion 40 and are also recessed behind the top surface 54 of the support panel 10. Also, when the apparatus 1 is mounted on a wall, the rear surface 56 of the diagonal segments 43 and 45 and rectangular segment 47 of each recessed portion 40 is adjacent to the wall and flush with the rear edge 57 of the outer frame 35 that is also adjacent to the wall, thereby stablizing the apparatus 1. It is foreseen that recessed portion 40 may be configured in other ways to provide support and stability for apparatus 1 when mounted on a wall.

First fastening means, such as the illustrated circular pieces of hook-and-loop fastening material 58, are adhered by glue or otherwise fixedly attached to the top surface 54 of support panel 10 in each rectangular section 12 at four locations situated between the recessed diagonal segments 43 and 45 and the corners 60, 61, 62 and 63 of section 12. Second fastening means, such as the illustrated circular pieces of hook-and-loop fastening material 66, are removably adhered by contact adhesive or otherwise fixedly attached to a rear surface 68 of compact disc container 5 near each corner thereof as shown in FIG. 6 and located to cooperate or mate with the hook-and-loop fastening pieces 58 on the support panel 10, when the rear surface 68 of the compact disc container 5 is placed adjacent to the top surface 54 of support panel 10 within each rectangular section 12, so as to secure the pieces 58 and 66 together.

It is foreseen that both the hook-and-loop fastener material 58 and hook-and-loop fastener material 66 may be located at locations other than near the corners of the rectangular section 12 and the corners of the rear surface 68 of the compact disc container 5, so that both fasteners 58 and 66 are positioned such that each piece of fastener material 58 is fixedly connected to each respective piece of fastener material 66 when container 5 is mounted upon support panel 10 located centrally within a rectangular section 12. Normally, the material 58 would be either hook-or-loop portions of a fastener with the material 66 being the opposite portion.

Frame members 15, 17, 19, 21 and 23 include first groove means illustrated by slots or grooves 75 adapted to 26 cooperate with a user's thumb and fingers providing space for a user to grasp a compact disc cover 36 and pivot the cover 36 to an open position, such as is shown in FIG. 4. Each rectangular section 12 includes two grooves 75. The grooves 75 are located near frame members 28, 30 and 32 that are oriented vertically when the apparatus 1 is mounted on a wall. The grooves 75 are of a depth and width to allow an operator to easily grasp a lower or upper edge of a compact disc cover 36.

Frame members 15, 17, 19, 21 and 23 also include second groove means illustrated by slots or grooves 80 adapted to cooperate with a user's thumb and fingers providing space for a user to grasp either a compact disc 7 or compact disc container 5 for removal from apparatus 1. Each rectangular section 12 includes two grooves 80 that are located midway between each of the frame members 26, 28, 30 and 32. The grooves are preferably of a U-shape and of a depth to allow a user's thumb and middle finger to easily grasp opposite edges of a compact disc 7 for removal from a container 5 that remains mounted on apparatus 1. The grooves 80 are also deep enough to allow a user to grasp opposite edges of a compact disc container 5 and detach hook-and-loop fastening material 66 from hook-and-loop fastening material 58 to remove container 5 from apparatus 1.

In operation, a user must first adhere hook-and-loop fastening material 66 to the back surface 68 of a compact disc container 5, as shown in FIG. 6, to cooperate with hook-and-loop fastening material 58 fixedly attached to the support panel 10. Preferably, a supply of the pieces of material 66 are provided with the apparatus and may be selectively adhered to the container 5 a user wishes to mount. Also preferably, the pieces of material 66 are secured with a contact adhesive that allows the pieces of material 68 to be removed from one container 5 and placed on another when a user wishes to modify the selection of discs 7 displayed on the apparatus 1. A compact disc container 5 is then mounted on apparatus 1 as shown in FIG. 3 by placing 3 a container 5 within a rectangular section 12, with a user's thumb 82 and middle finger 83 in the grooves 80. A user's thumb 82 and middle finger 83 may also be placed in appropriate grooves 80 to remove the container 5 from apparatus 1.

A user may remove a selected compact disc 7 only from a container 5 mounted on the apparatus 1 by placing the fingers 85 shown in FIG. 4 into appropriate grooves 75, grasping the front cover 36 of container 5 and pivoting the container cover 36 as shown in FIG. 4 to an open position as shown in FIG. 6. A user then places thumb 88 and middle fingers 90 into appropriate grooves 80, as is shown in FIG. 5, and removes compact disc 7 from the container 5. A user's thumb 88 and middle fingers 90 may also be placed in the appropriate grooves 80 to replace the compact disc 7 into the container 5.

It is to be understood that while certain forms of the present invention have been illustrated and described herein, it is not to be limited to the specific forms or arrangement of parts described and shown.

What is claimed and desired to be secured by Letters Patent is as follows:

1. A wall-mounted compact disc display apparatus for storage of compact discs located within plastic containers having front and back surfaces with the front surface including a hinged clear plastic front cover and displaying artwork underneath the front cover; said apparatus comprising:
 (a) a rectangular, generally flat, support panel having a plurality of recessed fastener securing regions adapted for mounted said panel on a wall;
 (b) a plurality of horizontal parallel first frame members projecting forwardly from said panel and fixedly connected thereto;
 (c) a plurality of vertical parallel second frame members projecting forwardly from said panel and fixedly connected thereto; said second frame members being perpendicular to said first frame members and dividing each of said first frame members into a plurality of horizontal segments each having an end and a midpoint; said first and second frame members dividing said support panel into a plurality of rectangular sections with each section adapted to be generally filled by one of the containers received therein with the front surface of such a container extending slightly forward of adjacent first and second frame members;
 (d) each of said horizontal segments having a first groove and a second groove; each of said first grooves being located near a respective segment end and adapted to provide space for a compact disc user's fingers during opening and closing of the hinged front cover of the container; each of said second grooves being located near a respective segment midpoint and adapted to provide space for a compact disc user's fingers during transfer of compact discs to and from the containers and during transfer of containers to and from the apparatus;

(e) a plurality of first hook-and-loop fastening material pieces fixedly attached to said panel within each of said rectangular sections; and (f) a plurality of second hook-and-loop fastening material pieces each being adapted to adhere to the back surface of a respective container; each of said second hook-and-loop pieces operably, respectively, fixedly securing each of said first hook-and-loop pieces located within each of said rectangular sections so as to be adapted to secure the containers within said rectangular sections.

2. A wall-mounted apparatus for storage and display of containers for stored media having hinged front covers; said apparatus comprising:

(a) a support panel adapted for mounting on a wall;

(b) a plurality of generally horizontal parallel first frame means projecting forwardly from said panel and fixedly connected thereto; said first frame means including first groove means located thereon adapted to provide space for a media user's fingers during opening and closing of the hinged front cover of each of the containers stored on the apparatus; said first frame means including second groove means located thereon adapted to provide space for a media user's fingers during transfer of media to and from the containers; said second groove means also providing space for a media user's fingers during transfer of each of the containers to and from the apparatus;

(c) a plurality of parallel second frame means projecting forwardly from said panel and fixedly connected thereto; said second frame means being perpendicular to said first frame means; said first and second frame means dividing said support panel into a plurality of rectangular sections so as to form a grid thereon and wherein said sections are each adapted to receive one of the containers therein; said first and second frame means having a height adapted to receive the container such that tops of the containers are positioned slightly forward of said first and second frame means;

(d) first fastening means fixedly attached to said panel within each of said rectangular sections;

(e) second fastening means adapted to adhere to a container on one side thereof and to fixedly attach to said first fastening means on the other side thereof;

(f) each of said first frame means is divided into a plurality of first frame sections by said plurality of second frame means; each of said first frame sections having an end and a midpoint; and (g) said first groove means includes a first groove located near said end of respective section and said second groove means includes a second groove located near said midpoint of a respective section.

3. The apparatus according to claim 2 wherein:

(a) said first and second fastening means are first and second portions of a hook-and-loop fastener.

4. A wall-mounted apparatus for storage and display of containers for stored media having hinged front covers; said apparatus comprising:

(a) a support panel adapted for mounting on a wall;

(b) a plurality of generally horizontal parallel first frame means projecting forwardly from said panel and fixedly connected thereto; said first frame means including first groove means located thereon adapted to provide space for a media user's fingers during opening and closing of the hinged front cover of each of the containers stored on the apparatus; said first frame means including second groove means located thereon adapted to provide space for a media user's fingers during transfer of media to and from the containers; said second groove means also providing space for a media user's fingers during transfer of each of the containers to and from the apparatus;

(c) a plurality of parallel second frame means projecting forwardly from said panel and fixedly connected thereto; said second frame means being perpendicular to said first frame means; said first and second frame means dividing said support panel into a plurality of rectangular sections so as to form a grid thereon and wherein said sections are each adapted to receive one of the containers therein; said first and second frame means having a height adapted to receive the container such that tops of the containers are positioned slightly forward of said first and second frame means;

(d) first fastening means fixedly attached to said panel within each of said rectangular sections;

(e) second fastening means adapted to adhere to a container on one side thereof and to fixedly attach to said first fastening means on the other side thereof; and (f) said support panel and said first and second frame means are constructed from plastic and said support panel having a recessed portion including first and second intersecting diagonal segments and an aperture located thereon; said segments adapted to lie adjacent against the wall to which the apparatus is mounted; said aperture adapted for mounting the apparatus to the wall.

* * * * *